United States Patent Office 3,836,504
Patented Sept. 17, 1974

3,836,504
PROCESS FOR PREPARING SHAPED PRODUCT MADE OF INORGANIC-ORGANIC COMPOSITE MATERIAL
Takao Morisawa, Yokkaichi, Japan, assignor to Mitsubishi Petrochemical Co., Ltd., Tokyo, Japan
No Drawing. Filed Mar. 6, 1972, Ser. No. 232,274
Claims priority, application Japan, Mar. 6, 1971, 46/12,031
Int. Cl. C08f 45/04
U.S. Cl. 260—42.55               8 Claims

ABSTRACT OF THE DISCLOSURE

A shaped article formed from an inorganic-organic composite is prepared by admixing an inorganic powder, wherein at least 10% by volume of said powder has a particulate diameter of less than 100μ, with 0.3–20% by weight of an aqueous emulsion of either a non-crystalline synthetic resin characterized by a deformation temperature of higher than room temperature or of a crystalline synthetic resin characterized by a melting point of higher than room temperature; shaping said mixture and heating to at least the deformation or melting temperature of said synthetic resin and thereafter cooling.

BACKGROUND OF THE INVENTION

Field Of The Invention

This invention relates to a process for preparing a shaped product prepared from an inorganic-organic composite and characterized by a high ratio of inorganic material, and having high strength properties.

Description Of Prior Art

Heretofore, a variety of different procedures have been employed to yield shaped articles from inorganic powders. For instance, ceramics have been prepared by calcining or sintering inorganic powders; cements have been prepared by hydraulic reactions involving inorganic powders; and thermosetting resins, such as epoxy resins, have been used to bind inorganic powders to form molded articles. However, the physical or chemical properties of the products formed from such conventional techniques have not been suitable for all purposes, and frequently such procedures have been unduly expensive for many purposes.

SUMMARY OF THE INVENTION

Accordingly, it is one object of this invention to provide a process whereby shaped articles having a high ratio of inorganic material and high strength properties, can be easily and economically prepared using an inorganic-organic composite.

This and other objects of this invention can be attained by admixing fine particles of an artificial or natural inorganic material wheren at least 10% by volume of said particles has a particle diameter of less than 100μ, with an aqueous emulsion of either a non-crystalline synthetic resin, having a deforming temperature of higher than room temperature, or of a crystalline synthetic resin, having a melting point of higher than room temperature, wherein said emulsion comprises between 0.3–20 percent by weight, preferably 2–10% by weight of said mixture.

The mixture is shaped, preferably by press-shaping, and then heated to a temperature of higher than the deforming or melting temperature of said synthetic resin, and then is cooled.

DETAILED DESCRIPTION OF THE PREFERRED EMBODIMENT

In accordance with the process of this invention, products having high strength properties and good chemical resistance, similar to so-called thermosetting resin ceramics, are prepared easily and at an economic cost, comparable to the costs for producing cement products.

In preparing the products of this invention, no special apparatus or special skills are required other than those required for preparing mortar or cement. For instance, a conventional forced kneading mixer is sufficient for mixing the components of the products of this invention. Since high temperature treatment is not required, there is no need to provide high temperature kilns or furnaces.

Nevertheless, the resulting products of this invention have been found to have as much as 400% greater bending strength as mortar and are either incombustible or difficulty combustible and there is no restriction on the size of the products prepared, as there is for ceramics. Accordingly, the products of this invention can suitably be used as construction or building materials.

These products are prepared by combining fine sized inorganic particles with a synthetic resin which has either a specifically defined melting point or a specifically defined deforming temperature, in the form of an aqueous emulsion of an organic element. The mixture is heat treated, shaped and cooled.

A wide variety of inorganic materials can be used in this invention, such as fly ash, silica, kaolin, montmorillonite, clay, volcanic pumice, glass powder, hollow glass beads, calcium carbonate, bentonite, titanium white, gypsum, calcium sulfite, blast furnace slag, cement, silica powder, etc. If the inorganic material is selected for its high chemical resistance or high water resistance, or high heat resistance, the ultimate product will have similar desirable properties. In general, the intended application and economic considerations will control the selection of the particular inorganic material to be used. It is quite an important factor of this invention to use the inorganic material in a particulate form, wherein at least 10% by volume of the particles has a diameter of less than 100μ, preferably less than 50μ in diameter. If more coarse particles are used in amounts of greater than 90% by volume, the resulting composite product will not have the high strength characteristics of those products of the present invention. The more fine particles as defined above, are finely dispersed within the gaps of the more coarse particles and provide synergistic benefits when further admixed with the synthetic resin. It is preferable, but not mandatory, that less than 100% of the particles used have diameters falling within the above fine particle definition. It is desirable for this purpose to admix a coarse aggregate with said composition, such as sand or fine stone, in amounts of from 0–90% by volume.

Two or more different types of the inorganic particles can be used if desired.

The synthetic resin used for the process of this invention may be a thermoplastic resin, such as polyethylene, polypropylene, polyvinylchloride, polystyrene, polyacrylic esters, polyacrylonitrile, polyvinylidenechloride, polyvinylacetate, polyamide, polybutene, polyisobutene; copolymers of the monomers of said resins, and blends of said resins, which have functional groups, such as those having carbonyl groups, epoxy groups, amino groups, hydroxy groups, or vinyl groups.

If the resin is non-crystalline, it should have a deforming temperature of at least room temperature, or if it is a crystalline resin, it should have a melting point of higher than room temperature. Preferably, the deforming or melting temperature is higher than 30° C., but will depend upon the use temperature.

Since the type of resin will have an effect on the strength of the resulting product, where the deforming temperature of melting point of the resin is too low, it will be difficult to obtain a product having sufficient strength.

The synthetic resin is preferably used in amounts of less than 20 percent by weight, based on the total weight of the composite from the viewpoint of incombustibility or cost.

On the other hand, greater than 0.3 percent by weight of synthetic resin is required to obtain high strength characteristics. Preferably, the synthetic resin is used in amounts of from 2–10% by weight. The synthetic resin is used in the form of an aqueous emulsion with the inorganic element.

The aqueous emulsion can also contain a minor portion of water soluble resin, if a substantial amount of resin is present in the dispersed phase. This emulsion can be prepared by conventional emulsion polymerization techniques or by emulsifying a melted synthetic resin. Suitable conventional emulsifiers may be used to obtain the emulsion.

It is not fully understood why the use of an emulsion will provide such exceptionally good results in binding the composite product and providing good mixing. However, it seems to be due to the manner in which the synthetic resin is adhered to the surface of the inorganic particles. The emulsion preferably should be free of organic solvents, so that the flame potential or toxicity of the product is reduced.

It is preferred to use 3–30 percent by weight of water based on the inorganic material. Where the amount of water is too small, workability and mixability of the composition will be inadequate so that the dispersibility of the resin will be insufficient. Where the amount of water used is too great, the degree of shrinkage occurring during shaping can be deleterious and the ultimate strength of the product can be adversely affected. Shaping can be carried out by pressing the product into a suitable mold or by extrusion. Optionally, such shaping can be preceded by removal of water.

The inorganic-organic composite can be shaped into any desired configuration, such as in the form of tubes, pipes, U-shaped grooves, piles, poles, cross-ties, arrow-shaped piles, pillars, roof plates, bars, floor plates, wall plates, etc. or ocean development products.

In order to obtain a high strength product, it is necessary to heat-treat the mixture with or without decreasing the amount of water present. It is necessary that the temperature of heat treatment be higher than the deforming temperature if a non-crystalline resin is used or higher than the melting point if a crystalline resin is used and is preferably higher than 30° C. above the deforming temperature or melting point. These temperatures should be maintained for more than 10 minutes.

If the mixture is heat-treated at too high a temperature (higher than 200° C.) for too long a period (more than 1 day), deterioration of the synthetic resin can result which can decrease the strength of the product. In order to prevent deterioration, it is possible to heat-treat the mixture in an inert gaseous atmosphere, in vacuo or under high pressure to promote the heat treatment.

Having now generally described the invention, a further understanding can be obtained by reference to certain specific Examples which are provided herein for purposes of illustration only and are not intended to be limiting in any manner, unless otherwise specified.

EXAMPLE 1

A fly ash having a diameter of 2–3$\mu$ was used as the inorganic material and a standard cement grade sand having a particulate diameter of 100–300$\mu$ was admixed with the fly ash and an emulsion of a copolymer of styrene-butylacrylate having a deforming temperature of about 80° C. which contains 12 percent by weight, based on the total of the inorganic and organic materials, was admixed therewith. The fluidity of the mixture was 130–200 mm. of mortar flow value.

The resulting mixture was pressed into a mold to form bending a sheet of 4 x 4 x 16 cm. and was removed from the mold after 1 or 2 days. The shaped material was heat-treated for 10 days as shown in Table I.

The results of bending test measurements are shown in Table I.

TABLE I

| Composition (weight percent) | | | Bending strength (kg./cm.²) | | | Tensile strength (kg./cm.²) | | Compressing strength (kg./cm.²) | |
|---|---|---|---|---|---|---|---|---|---|
| Synthetic resin | Inorganic material | Aggregate | No heat treatment | Heat treatment | Result of dipping in 20% H₂SO₄ | No heat treatment | Heat treatment | No heat treatment | Heat treatment |
| 0 | 65 | 35 | | | | | | | |
| 2 | 63 | 35 | | | 25.6 | No corrosion | | 10.5 | | 69 |
| 4 | 61 | 35 | 10 | 114.9 | do | 4.2 | 46 | 27 | 311 |
| 6 | 59 | 35 | 19 | 242.3 | do | 7.9 | 101 | 51 | 654 |
| 8 | 57 | 35 | 20 | 257.4 | do | 8.3 | 107 | 54 | 693 |

As the reference, the corresponding data of mortar was shown.

| Tensile strength (kg./cm.²) | Bending strength (kg./cm.²) | Compressing strength (kg./cm.²) |
|---|---|---|
| 20–30 | 50–70 | 200–300 |

EXAMPLE 2

In accordance with the process of Example 1, the same experiments were conducted except that the amounts of fly ash were varied. The results are shown in Table II.

TABLE II

| Composition (weight percent) | | | Bending strength (kg./cm.²) | | | Tensile strength (kg./cm.²) | | Compressing strength (kg./cm.²) | |
|---|---|---|---|---|---|---|---|---|---|
| Synthetic resin | Inorganic material | Aggregate | No heat treatment | Heat treatment | Result of dipping in 20% H₂SO₄ | No heat treatment | Heat treatment | No heat treatment | Heat treatment |
| 6 | 74 | 20 | 10 | 127.9 | No corrosion | 4.2 | 58 | 27 | 307 |
| 6 | 59 | 35 | 19 | 243.3 | do | 7.9 | 101 | 51 | 583 |
| 6 | 44 | 50 | 11 | 143.5 | do | 4.6 | 60 | 30 | 344 |
| 6 | 29 | 65 | 7 | 82.2 | do | 2.9 | 34 | 19 | 197 |
| 6 | 14 | 80 | | 63.0 | do | 2.9 | 26 | | 151 |
| 6 | 0 | 100 | | 5.2 | do | | | | 12 |

NOTE.—Measurement could not be done.

EXAMPLE 3

In accordance with the process of Example 1, the same experiments were repeated except using a mixture of standard cement grade sand of a particulate diameter of 100–300$\mu$ as the aggregate and bentonite having a particulate diameter of less than 10$\mu$, hollow glass beads having an average diameter of 50$\mu$, cement having an average diameter of 30$\mu$ and gypsum having an average diameter of 30$\mu$.

The results are shown in Table III.

TABLE III

| Composition (wt. percent) | | Bending strength (kg./cm.²) | | Result of dipping in 20% H₂SO₄ | Tensile strength (kg./cm.²) | | Compressing strength (kg./cm.²) | |
|---|---|---|---|---|---|---|---|---|
| Synthetic resin | Inorganic material, item | Aggregate | No heat treatment | Heat treatment | | No heat treatment | Heat treatment | No heat treatment | Heat treatment |
| 6 | Bentonite, 30 | 64 | 150 | | No corrosion | 63 | | 360 |
| 6 | Hollow glass beads, 94 | 0 | 180 | | do | 75 | | 432 |
| 6 | Cement, 30 | 64 | 190 | 40.1 | Corrosion | 16.2 | 79 | 96 | 456 |
| 6 | Gypsum, 30 | 64 | 60 | 15.3 | do | 6.4 | 25 | 37 | 144 |

EXAMPLE 4

The inorganic material and aggregates shown in Example 1 were admixed with an aqueous emulsion of a copolymer of ethylene-vinylacetate having a melting point of about 80° C. at the rate of 12 percent by weight of water based on the total weight of solid, and then the mixture was treated in accordance with the process of Example 1.

TABLE IV

| Composition (weight percent) | | | Bending strength (kg./cm.²) | | Result of dipping in 20% H₂SO₄ | Tensile strength (kg./cm.²) | | Compressing strength (kg./cm.²) | |
|---|---|---|---|---|---|---|---|---|---|
| Synthetic resin | Inorganic material | Aggregate | No heat treatment | Heat treatment | | No heat treatment | Heat treatment | No heat treatment | Heat treatment |
| 0 | 34 | 66 | | | | | | | |
| 5 | 29 | 66 | | 74.2 | No corrosion | | 31 | | 200 |
| 10 | 24 | 66 | 11.5 | 122.8 | do | 4.8 | 51 | 31 | 332 |

EXAMPLE 5

The inorganic material and aggregates shown in Example 1 were admixed with an aqueous emulsion of polystyrene having a deforming temperature of 100° C. at the rate of 12 percent by weight of water based on the total weight of solid and then the mixture was treated in accordance with the process of Example 1.

TABLE V

| Composition (weight percent) | | | Bending strength (kg./cm.²) | | Result of dipping in 20% H₂SO₄ | Tensile strength (kg./cm.²) | | Compressing strength (kg./cm.²) | |
|---|---|---|---|---|---|---|---|---|---|
| Synthetic resin | Inorganic material | Aggregate | No heat treatment | Heat treatment | | No heat treatment | Heat treatment | No heat treatment | Heat treatment |
| 0 | 34 | 66 | | | | | | | |
| 5 | 29 | 66 | | 44 | | 105.8 | | 286 | No corrosion. |
| 18 | 24 | 66 | 6.3 | 80 | 15.2 | 192.7 | 41 | 521 | Do. |

As is clear in the results of the experiments, each of the tensile, bending and compressive strength of the shaped product prepared by the process of this invention are significantly higher than that of prior art materials. This is believed to be a highly unpredictable result.

Having now fully described the invention, it will be apparent to one of ordinary skill in the art that many changes and modifications can be made thereto without departing from the spirit or scope of the invention as set forth herein.

Accordingly, what is claimed and intended to be covered by Letters Patent is:

1. A process for preparing a shaped composite product which comprises admixing an inorganic powder of a combination of from 14 to 74 wt. percent flyash having a diameter of 2 to 3μ and 80 to 20 wt. percent of an aggregate of cement grade sand having a particle diameter of 100–300μ, with a sufficient quantity of an aqueous emulsion of non-crystalline synthetic resin selected from the group consisting of styrene-butylacrylate, polystyrene and ethylene-vinylacetate having a deforming temperature or a crystalline synthetic resin having a melting point higher than room temperature to produce a shaped composite containing from 0.3 to 20 percent of synthetic resin by weight based on the total weight of the composite, shaping said mixture, heat-treating said shaped mixture at a temperature higher than the deforming temperature or the melting point of the synthetic resin, and cooling said heated shaped mixture to obtain the shaped composite product.

2. The process of Claim 1, wherein the shaped material is heat-treated at a temperature of higher than 30° C. above the deforming temperature or the melting point of the synthetic resin.

3. The process of Claim 1, wherein said mixture of inorganic powder and aqueous emulsion of synthetic resin is shaped by compression so that the fine particles of said fly ash will fill in the gaps between said coarse aggregate particles of sand together with said aqueous emulsion of said synthetic resin.

4. The process of Claim 1 wherein the synthetic resin is present in amounts of 2 to 10 percent by weight.

5. The process of Claim 1, wherein the aqueous emulsion contains 3 to 30 percent by weight of water based on the weight of inorganic powder.

6. The process of Claim 1, wherein the aqueous emulsion is an emulsion of a copolymer of styrene-butylacrylate.

7. The process of Claim 1, wherein the composite product contains 8 weight percent of synthetic resin, 57 weight percent of fly ash and 35 weight percent of cement grade sand.

8. The process of Claim 2, wherein the temperature is maintained for more than 10 minutes during said heat treatment.

References Cited

UNITED STATES PATENTS

| 3,011,904 | 12/1961 | Ballentine | 260—41 A |
| 2,846,332 | 8/1958 | Nesty | 260—37 N |
| 2,875,171 | 2/1959 | Foster | 260—29.2 N |
| 3,249,463 | 5/1966 | Carlee | 260—41 A |
| 3,697,467 | 10/1972 | Haughney | 260—41 A |
| 2,592,147 | 4/1952 | Ikeda | 260—41 B |
| 2,597,872 | 5/1952 | Iler | 260—41 A |
| 3,421,277 | 1/1969 | Frischmuth | 260—29.6 ME |
| 3,706,696 | 12/1972 | Bernett | 260—29.6 E |

ALLAN LIEBERMAN, Primary Examiner

P. R. MICHL, Assistant Examiner

U.S. Cl. X.R.

260—37 N, 34.2, 42, 46, 42.47, 42.48, 42.49, 42.52, 42